United States Patent
Sardat et al.

(10) Patent No.: US 8,288,991 B2
(45) Date of Patent: Oct. 16, 2012

(54) ENERGY STORAGE DEVICE WITH ASSEMBLY OF ENERGY STORAGE CELLS AND BALANCING CIRCUIT

(75) Inventors: Pierre Sardat, Le Raincy (FR); Jean-Claude Matt, Dijon (FR); Hugues Doffin, Chatenay Malabry (FR); Bruno Dessirier, Saint Germain en Laye (FR)

(73) Assignee: Valeo Equipements Electriques Moteur, Creteil (FR)

( * ) Notice: Subject to any disclaimer, the term of this patent is extended or adjusted under 35 U.S.C. 154(b) by 355 days.

(21) Appl. No.: 12/596,376

(22) PCT Filed: Apr. 7, 2008

(86) PCT No.: PCT/FR2008/050609
§ 371 (c)(1),
(2), (4) Date: Dec. 22, 2009

(87) PCT Pub. No.: WO2008/139103
PCT Pub. Date: Nov. 20, 2008

(65) Prior Publication Data
US 2010/0090649 A1    Apr. 15, 2010

(30) Foreign Application Priority Data

Apr. 18, 2007  (FR) ..................... 07 54534
Dec. 10, 2007  (FR) ..................... 07 59684
Feb. 6, 2008   (FR) ..................... 08 50761

(51) Int. Cl.
*H01M 10/44* (2006.01)
*H01M 10/46* (2006.01)
(52) U.S. Cl. .................................. 320/118
(58) Field of Classification Search .......... 320/107, 320/116, 117, 118, 119
See application file for complete search history.

(56) References Cited

U.S. PATENT DOCUMENTS

| | | |
|---|---|---|
| 5,594,320 A | 1/1997 | Pacholok et al. |
| 5,644,212 A | 7/1997 | Takahashi |
| 5,814,970 A | 9/1998 | Schmidt |
| 5,869,950 A | 2/1999 | Hoffman et al. |
| 6,150,795 A | 11/2000 | Kutkut et al. |
| 6,624,612 B1 | 9/2003 | Lundquist |
| 6,686,724 B2 * | 2/2004 | Coates et al. ............ 320/135 |
| 6,771,045 B1 | 8/2004 | Keller |
| 2002/0017895 A1 * | 2/2002 | Kawashima ............ 320/118 |
| 2002/0190692 A1 | 12/2002 | Marten |
| 2004/0135546 A1 * | 7/2004 | Chertok et al. .......... 320/118 |
| 2005/0017682 A1 * | 1/2005 | Canter et al. ............ 320/118 |
| 2005/0110460 A1 * | 5/2005 | Arai et al. ............... 320/116 |
| 2006/0097698 A1 * | 5/2006 | Plett ....................... 320/118 |
| 2006/0119319 A1 | 6/2006 | Sakurai et al. |
| 2006/0214636 A1 | 9/2006 | Arai et al. |
| 2007/0090799 A1 * | 4/2007 | Lee et al. ................. 320/118 |
| 2008/0191663 A1 * | 8/2008 | Fowler et al. ............ 320/118 |

* cited by examiner

*Primary Examiner* — Edward Tso
(74) *Attorney, Agent, or Firm* — Berenato & White, LLC

(57) ABSTRACT

The invention relates to an energy storage device, particularly for an automobile, that comprises: an assembly (2) of serially-connected energy storage cells; a balancing circuit adapted for balancing the cells during the discharge thereof by enabling the flow of one or more balancing currents in one or more cells of the assembly (2); optionally a diagnosis system (61) for providing at least one piece of information associated with at least one cell in the assembly; wherein the balancing circuit (10; 41) is adapted for controlling the balancing current(s) based at least on external information independent from the energy-storage cell assembly and/or information associated with at least one of the cells and provided by the optional diagnosis system.

26 Claims, 6 Drawing Sheets

ENERGY STORAGE DEVICE WITH ASSEMBLY OF ENERGY STORAGE CELLS AND BALANCING CIRCUIT

FIELD OF THE INVENTION

The invention relates to an energy storage device comprising an assembly of serially-connected energy storage cells.

The invention is especially suitable for use in the domain of motor vehicles, the energy storage device being configured, for example to be charged during a recuperative braking phase and discharged during starting and acceleration phases of the vehicle.

BACKGROUND OF THE INVENTION

In general, for a line of energy storage cells connected in series, for example, each cell comprising a supercondenser, some differences in charging voltage may arise between the cells due to:

differences between the capacitance values inherent in the manufacture of the cells,
the existence of leakage currents of different intensities.

The persistence of these discrepancies over time can cause accelerated ageing, or even the destruction, of the cells which endure the highest charging voltages.

Different methods have been proposed to correct these imbalances.

For example, US patent application 2003/0214267 discloses a system for energy storage consisting of a line of cells, for example capacitive cells, assembled in series. This system comprises, for each cell, a balancing circuit to balance the leakage currents associated with the cells. This balancing circuit is formed by one resistor and one diode. This application, US 2003/0214267, also describes a balancing circuit incorporating an operational amplifier.

Also known, from U.S. Pat. No. 5,659,237, is a device for balancing the charge within a line of energy storage cells connected in series. This device includes a transformer of the flyback type making it possible, in each switching cycle of a MOSFET transistor, to transfer a certain quantity of energy to those cells in the line which exhibit the lowest voltages. This device draws energy to be transferred from a charger which is itself connected to an AC source.

US patent application 2005/0269988 describes an energy storage device enabling balancing on two levels, to wit, intra-modular and inter-modular.

U.S. Pat. No. 6,771,045 describes a device for charging with power and balancing the packs of batteries using a processor.

U.S. Pat. No. 6,150,795 describes balancing while charging batteries by using a transformer with two primary and secondary windings. These windings have the same number of turns.

U.S. Pat. No. 5,594,320 describes a balancing of the charge in the cells utilising a transformer containing the same number of windings as the number of cells.

SUMMARY OF THE INVENTION

The present invention aims in particular to improve further the balancing of energy storage cells connected in series.

The object of the invention is therefore an energy storage device, in particular for a motor vehicle, comprising:

an assembly of energy storage cells connected in series,
a balancing circuit configured to enable energy to be drawn from at least one of said cells and to distribute the energy thus drawn to at least one other of said cells.

In one embodiment of the invention, the balancing circuit is configured to allow, during a discharge phase of the energy storage device, the charging voltage of at least one of the cells to be increased only with the energy drawn from at least one of the energy storage cells of the device.

In particular, the invention allows the differences between the leakage currents of the energy storage cells to be compensated while accompanying a natural discharge of the assembly of cells, by adding energy to those cells with the lowest charging voltage, thus ensuring automatic balancing during discharge.

Since the energy enabling the voltage of the cells to be balanced is taken from the assembly of cells itself, to the exclusion of any external energy source, the energy storage device according to the invention is capable of remaining charged symmetrically regardless of its state of charge, including for very low values of charging voltage.

The assembly of cells in series may be available permanently to accumulate a charge or to discharge itself to supply power, when the vehicle is operational. It is not essential to disconnect or to switch off the balancing circuit when the assembly of cells is utilised while the vehicle is in operation. The balancing circuit can be configured so that it can be connected permanently to a power supply network of the vehicle.

The invention also makes it possible to ensure that the energy storage device is capable of consuming as little energy as possible from the cells, especially in a situation in which resistors are utilised to effect balancing.

The discharge times of the cells can thus be relatively long.

Advantageously, the balancing circuit is configured to allow symmetrical discharge of the cells to a voltage at least 3 times lower than the maximum serviceable voltage of the cells, in particular at least 10 times lower, preferably at least 20 times lower.

For example, for an assembly of ten cells in series, the voltage at the exterior terminals of which is about 20 Volts in the charged state, the discharge of the cells can, in some circumstances, result in a value of charging voltage at the terminals of this assembly which is close to 2 V. In this case, the difference in voltage between the cells in the deeply discharged state (for example, when the vehicle remains stationary for a long time in a car park) may be less than 0.2 V.

Even when there is a deep discharge, and because of these low differences in voltage between the cells, it is possible to recharge the cells rapidly at a very high current by the power electronics of the vehicle, up to a high voltage value, without the risk of over-voltage in certain of the cells.

In another embodiment of the invention, the balancing circuit is configured so that it can be powered by an external energy source, in particular a battery of a motor vehicle, with a view to limiting the discharge of the cells to a predetermined voltage threshold, the voltage at the terminals of the assembly of cells being maintained, in particular, at about the voltage of the battery.

Today's batteries may enable this voltage threshold to be maintained over a period in the order of one year.

This makes it possible, if desired, to avoid the energy storage cells becoming excessively discharged.

In one embodiment of the invention, the balancing circuit is configured in such a way that the energy drawn from at least one of the cells is stored in the form of inductive energy before being transferred to one or more other cells.

Advantageously, the balancing circuit is configured to draw energy from the exterior terminals of the assembly of cells.

Preferably, the balancing circuit includes one or more transformers, in particular of the flyback type.

This transformer can, if required, be associated with a switch, in particular a transistor such as a MOSFET transistor, and the balancing circuit may include an oscillator configured to control the commutation of said switch.

The transformer may optionally include primary and secondary windings with a different number of turns. As a variant, the primary and secondary windings may have an identical number of turns.

In one embodiment of the invention, the transformer includes a number of windings equal to the number of energy storage cells plus one.

The oscillator may, for example, be configured to generate a rectangular control signal.

Preferably, the oscillator is powered by an electric current drawn from the assembly of cells. This enables the device to be independent of an external power source.

As a variant, the oscillator may be connected to an external power source.

In another embodiment of the invention, the balancing circuit is configured such that the energy drawn from at least one of the cells is stored in the form of capacitive energy before being transferred to one or more cells.

Advantageously, the balancing circuit is configured to draw energy at two terminals of at least one of the cells, in particular only one of the cells.

If desired, the balancing circuit may include at least one multiplexer, in particular an analogue multiplexer.

The device may, if required, include a diagnostic system to determine any differences in voltage between the cells and/or to determine the maximum voltage at the terminals of each cell, in particular with a view to performing a diagnosis of the health of the cells.

Depending on an ageing model of the cells and an estimate of leakage currents and of the capacitance of each cell, it is possible to choose to balance the cells at slightly different voltage values, in particular if the capacity of the cells becomes different between the cells.

Preferably, at least one of the energy storage cells includes at least one supercondenser.

In one embodiment of the invention, the balancing circuit is configured so as to control a balancing current value of the cells depending on at least one of the temperature and of the voltage at the terminals of the assembly of cells.

This makes it possible to compensate for the influence of the temperature and/or of the voltage on the value of the leakage current of the cells.

The energy storage device may be utilised in a motor vehicle, and may be configured to be charged during a recuperative braking phase and discharged during starting and/or acceleration phases of the vehicle.

The further object of the invention is a method for balancing the charging voltage of an assembly of energy storage cells connected in series, in particular utilised in a motor vehicle, the method comprising the following steps:
    drawing energy from at least one of the cells,
    distributing the energy thus drawn to at least one other of said cells.

In one embodiment of the invention, during a discharge phase when the cells are not being used, the energy distributed to the energy storage cells originates solely from the energy drawn from one or more cells of said assembly.

In another embodiment of the invention, when the energy storage cells are not being used, the discharge of the cells is limited to a pre-determined voltage threshold by balancing the cells by drawing and distributing energy between them and drawing supplementary energy from a source of energy other than the cells, in particular from a motor vehicle battery.

Moreover, there is a need to maintain the balance of an assembly of energy storage cells, in particular formed by supercondensers, when this assembly is left inactive for a long period.

This relates in particular to a case where a motor vehicle using an assembly of cells of this type is left parked for a long period, for example several weeks.

Thus the object of the invention is, independently of or in combination with the foregoing, an energy storage device, in particular for a motor vehicle, comprising:
    an assembly of energy storage cells connected in series,
    a balancing circuit configured to enable, in a first phase, a discharge and a balancing of the cells at least to a low predetermined voltage threshold at the terminals of the energy storage cells and, in a second phase following the first phase, an accelerated discharge of the cells below said low predetermined threshold.

Preferably, the balancing circuit is configured in such a way that at the end of the second phase, the voltage at the terminals of each of the cells is essentially zero.

In the invention, during the first phase, the discharge may be slow with the result that when the device is left unused over a relatively long period, the cells discharge themselves as little as possible in order to limit energy losses.

It is preferable, during this first phase, to supplement the discharge to the lowest possible voltage threshold.

During the whole of the first phase, the cells discharge themselves symmetrically, ensuring they are balanced.

Over especially long periods of inactivity of the device, it may turn out that the balancing of the cells cannot be guaranteed clue to the fact that there is insufficient voltage available.

With the aid of the invention, during the second phase, when the voltage goes below the low predetermined threshold, and becomes insufficient to enable the cells to be balanced, the balancing circuit orders an accelerated discharge of the cells, using a discharge current of the cells with a higher intensity than that of the discharge currents in the cells during the first phase.

The rapid discharge of the cells in the second phase, due to this strong discharge current, ensures that all the cells of the assembly attain a full discharge, to more or less 0 Volt (for example to about one fifth or one tenth of the low predetermined voltage threshold at the terminals of the cells), in a lapse of time much shorter than that of the first phase.

During the second phase, the forced rapid discharge speeds up the natural discharge of the cells, a natural discharge which can lead to imbalances between cells due to different leakage currents between cells.

In other words, the rapid discharge imposed during the second phase allows the cells to discharge completely before any imbalance arises between the cells.

Thus, even without applying a specific balancing of the cells during the second phase, it is possible to discharge the cells while still preserving their balance.

When the cells are recharged by an external energy source, for example from a DC/DC converter in a vehicle, the recharge may start on the cells which are already balanced to a common value of about 0 V.

In one embodiment of the invention, the balancing circuit is configured in such a way that the duration of the first phase is greater than that of the second phase, in particular at least 10 times or 20 times greater, for example at least 50 or 100 times greater.

If desired, the balancing circuit ceases the forced balancing of the cells at the end of the first phase.

The balancing circuit may comprise an accelerated discharge module configured to enable, in the second phase, the occurrence of a discharge current of the cells with a higher intensity than that of the discharge currents in the cells during the first phase.

The discharge current in the second phase is advantageously controlled in intensity so that at the end of this second phase the cells remain more or less balanced.

The balancing circuit preferably comprises an oscillator configured to control the balancing of the cells in the first phase, and an auxiliary electric power module of the oscillator, this auxiliary power module containing, in particular, a transformer such as a flyback transformer.

Advantageously the auxiliary electric power module ceases to function when the low predetermined voltage threshold is attained. At this moment, the oscillator enabling the cells to be balanced switches off, and the second phase commences.

In one embodiment of the invention, the accelerated discharge module comprises a transistor, in particular an N-channel depletion mode MOSFET transistor. This MOSFET transistor is for example a model BSP149 transistor marketed by INFINEON.

Preferably, the accelerated discharge module includes a charge pump, in particular with diodes, connected to the depletion-mode transistor so that when the auxiliary power module ceases to function, this transistor is conductive, assuring the circulation of a strong discharge current in the assembly of cells.

Advantageously, the accelerated discharge module comprises at least one resistor connected to the energy storage cells at least at the end of the second phase and configured to prevent them potentially being recharged by an electrochemical effect.

In fact, the cells may exhibit the property of recharging all by themselves by electrochemical effect, which can create imbalances between cells.

Preferably the aforementioned resistor is effectively connected to the cells only when the accelerated discharge module is set to function and the deep discharge of the cells has ended.

In one embodiment of the invention, the balancing circuit is configured in such a way that the discharge of the second phase is deactivated when the voltage at the terminals of the assembly of cells becomes greater than a high voltage threshold.

If desired, the balancing circuit is configured so that during the first phase, energy can be drawn from at least one of the cells of the assembly and the energy thus drawn can be distributed to at least one other of the cells of the assembly, with a view to balancing the cells.

The balancing circuit may be configured such that during the first phase, the energy drawn from at least one of the cells is stored in the form of inductive energy before being transferred to one or more other cells, notably using a transformer such as a flyback transformer.

The object of the invention is also a method of supplementing the discharge of an assembly of energy storage cells connected in series, in particular intended to equip a motor vehicle, comprising the following steps:

to enable, in a first phase, a discharge and a balancing of the cells to at least a low predetermined voltage threshold at the terminals of the energy storage cells, to enable, in a second phase following the first phase, an accelerated discharge of the cells to below said low predetermined threshold.

The further object of the invention, independently or in combination with the foregoing, is an energy storage device, in particular for a motor vehicle, comprising:

an assembly of energy storage cells connected in series, a balancing circuit configured to enable balancing of the cells while they are discharging, by circulating one or more balancing currents in one or more cells of the assembly, an optional diagnostic system configured to enable the delivery of at least one piece of information associated with at least one of the cells of the assembly, the balancing circuit being configured to control the balancing current(s) and/or the duration of balancing at least depending on an external piece of information independent of the assembly of energy storage cells and/or a piece of information associated with at least one of the cells, delivered by the optional diagnostic system.

With the aid of the invention, it is possible to balance the cells effectively when the motor vehicle is running. In fact, when the vehicle is running (state given, for example, by an external piece of information), the electric consumption by the balancing circuit may be low or high, regardless, and it is thus relatively easy to activate supplementary functions in order to balance in the most appropriate fashion. For example, the balancing may be realised with an adjusted current, for example via a control of this current or a suitable frequency of the balancing pulses. When the balancing consumes a strong current, this is effective because the leakage currents of the different energy storage cells are negligible compared to the currents exchanged between the cells.

On the other hand, when the vehicle stops, the balancing of strong currents leads to a risk of rapid discharge of the cells.

The diagnostic system is advantageously configured to deliver a piece of information selected from: temperature information associated with at least one of the cells, voltage information associated with one of the cells, voltage information associated with several cells of the assembly, voltage information at the terminals of the assembly itself.

The balancing circuit may, in particular, be configured to allow the intensity of the balancing current or currents to be varied from 0 Amperes to a predetermined maximum value, in particular depending on the aforementioned pieces of information. This maximum current is in particular the maximum current authorised by the dimensions of the power part of the balancing circuit.

If necessary, the balancing circuit is maintained in operation for as long as the temperature associated with at least one of the cells is above a predetermined threshold, in particular equal to approximately 30 or 40° C.

Below this temperature threshold, the balancing circuit is switched off, if desired.

In one embodiment of the invention, the diagnostic system may be configured to control the starting and/or the interruption of the balancing circuit.

The aforementioned external piece of information is in particular selected from among: voltage information for a battery powering the vehicle's onboard network, information issued by a battery management system (BMS), information for activation of the balancing circuit, in particular issued by an engine control system or an onboard computer, information linked to the detection of an ignition key in position +APC "after contact".

In one embodiment of the invention, the balancing circuit is configured to be able to function in two modes, a first mode in which the balancing of the energy storage cells is supplemented by one or more low balancing currents, especially when the vehicle is stationary, and a second mode in which the balancing of the cells is supplemented by one or more strong balancing currents, especially when the vehicle is moving.

Advantageously the balancing circuit switches from the first mode to the second mode once the voltage at the terminals of a battery of the vehicle or at the terminals of the assembly of cells exceeds a predetermined threshold, for example equal to 12 or 13 Volts.

The invention thus enables better management of the balancing, depending on whether the vehicle is stationary or moving.

The device advantageously comprises an oscillator configured to control the starting and/or the interruption of the balancing circuit intermittently, notably via the diagnostic system.

For example, the oscillator is configured to control the starting and the interruption of the diagnostic system.

In one embodiment of the invention, the balancing circuit is configured to function for a predetermined period after being started by the oscillator, then, if necessary, to switch itself off after this predetermined period.

The intermittent activation of the balancing circuit, due to pieces of information external or internal to the device or due to the oscillator, enables electrical consumption to be reduced, which is advantageous when the vehicle is stationary.

The balancing circuit includes, for example, one or more transformers of the flyback type.

In one embodiment of the invention, if the diagnostic system measures the voltages of each cell, this diagnostic system controls the stoppage of the balancing when the voltage difference of the cells falls below a threshold, for example a threshold equal to 0.1 Volt. The balancing is relaunched either by an internal oscillator or by an external device.

The object of the invention is also, independently or in combination with the foregoing, an energy storage device, in particular for a motor vehicle, comprising:
- an assembly of energy storage cells connected in series,
- a balancing circuit configured to enable a balancing of the cells while they are discharging,
- an oscillator configured to enable the intermittent starting and/or the stoppage of the balancing circuit.

The invention has the further object of a method for balancing during discharge, when the motor vehicle is stationary or moving, of an energy storage device comprising an assembly of energy storage cells connected in series, the method comprising the following steps:
- to enable balancing of the cells while they are discharging, by circulating one or more balancing currents in one or more cells of the assembly,
- to control the balancing current or currents, in particular to provoke the triggering of the balancing, at least depending on an external piece of information independent of the assembly of energy storage cells and/or of a piece of information associated with at least one of the cells.

The balancing circuit is advantageously configured to allow the intensity of the balancing current or currents to be varied depending on the state of ageing of the cell or cells, in particular of at least one of the following pieces of information: a value of the internal resistance of the energy storage cell or cells (ESR or Equivalent Series Resistance), a capacitance value of the energy storage cell or cells, the state of charge of one or more cells (SOC), the state of energy of one or more cells (SOE).

Since the balancing is realised intermittently, the duration of a balancing phase and/or the duration between two successive starts of the balancing may be linked to the state of ageing of the cell or cells, in particular to at least one of the following pieces of information: a value of the internal resistance of the energy storage cell or cells (ESR or Equivalent Series Resistance), a capacitance value of the energy storage cell or cells, the state of charge of one or more cells (SOC), the state of energy of one or more cells (SOE).

The variation of the intensity of the balancing current or currents and the duration of the balancing and the frequency of the balancing are advantageously rendered mutually dependent and/or dependent on the observed state of ageing of the energy storage cell or cells.

The duration between two activation signals of the balancing is, if desired, selected depending on the state of ageing of the energy storage cell or cells, in particular of at least one of the following pieces of information: a value of the internal resistance of the energy storage cell or cells (ESR or Equivalent Series Resistance), a capacitance value of the energy storage cell or cells, the state of charge of one or more cells (SOC), the state of energy of one or more cells (SOE).

In one embodiment of the invention, the device is configured to deliver information about the end of life of the energy storage cell or cells, in particular in the form of a warning signal, depending on at least one of the frequency of activation of the balancing circuit and the intensity of the balancing current or currents.

BRIEF DESCRIPTION OF THE DRAWINGS

The invention may be better understood by reading the following detailed description of non-limitative examples of embodiments of the invention, and to the examination of the annexed drawing, in which.

DETAILED DESCRIPTION

Figure 1:
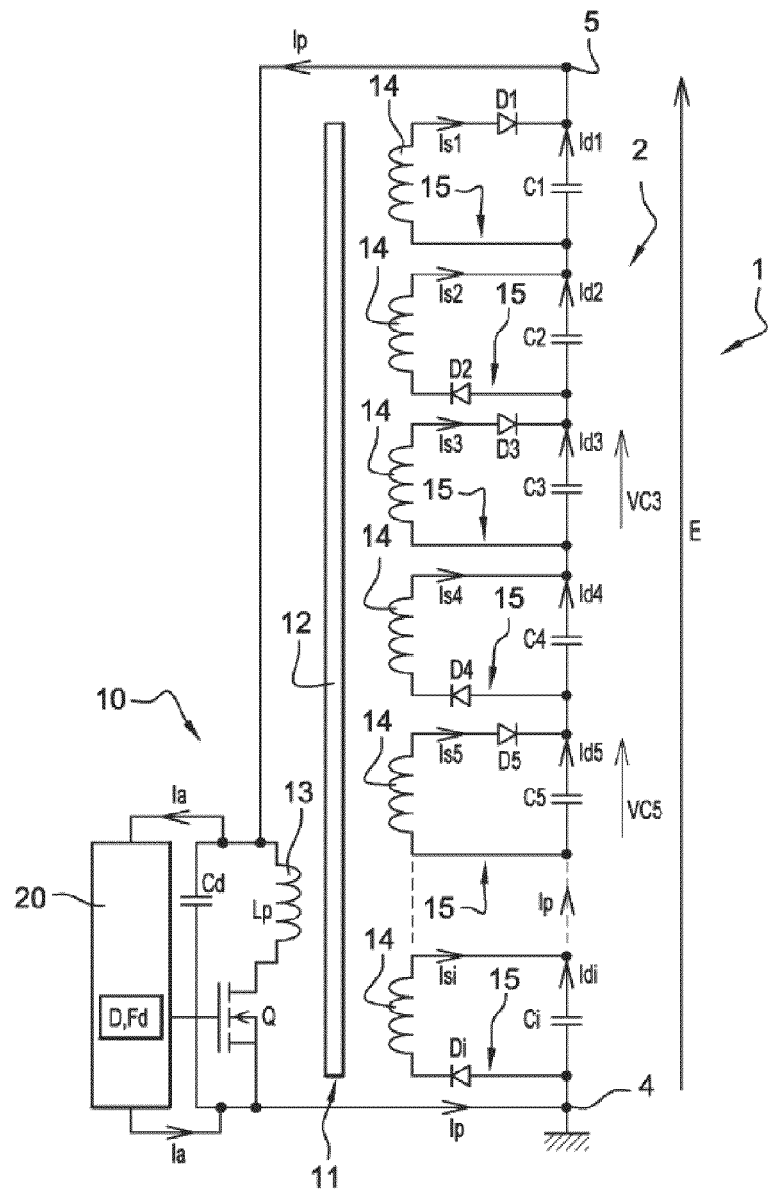
FIG. 1 represents, in diagram form and partially, an energy storage device according to one embodiment of the invention.

FIG. 1 shows an energy storage device 1 according to the invention, comprising an assembly 2 of energy storage cells C1, C2, ... Ci connected in series. The number of cells Ci is for example equal to 10.

In the example considered, each cell C1, C2, ... Ci is formed by a single supercondenser.

The device 1 is configured to be used in a motor vehicle, being charged during a recuperative braking phase and discharged during phases of starting and/or acceleration of the vehicle.

The assembly 2 comprises two external terminals 4 and 5, of which one, 4, is connected to an earth connection, for example.

The voltage at terminals 4 and 5 of the assembly 2 is marked E, that at the terminals of each cell Ci is marked Vci.

Ip designates the current circulating between the terminals 4 and 5 of the assembly 2.

Idi refers to a discharge current associated with each cell Ci.

The device 1 comprises a balancing circuit 10 configured to enable energy to be drawn from at least one of the cells C1, C2, ... Ci and the energy thus drawn to be distributed to at least one other of said cells.

In the example described, the balancing circuit 10 is configured to allow, during a discharge phase of the device 1, the charging voltage of at least one of the cells C1, C2, ... Ci to be increased only with the energy drawn from at least one of the other energy storage cells.

The balancing circuit 10 comprises a transformer of the flyback type 11 equipped with a core 12, a primary inductance winding Lp 13 and secondary windings 14.

The primary winding 13 is mounted in series with a switch Q formed by a transistor.

In the example considered, the transistor Q is a MOSFET transistor with a drain connected to the primary winding 13 and a source connected to the terminal 4.

The primary winding 13 and the switch Q are connected to the external terminals 4 and 5 of the assembly 2.

Each secondary winding 14 forms part of a loop 15 connected to the terminals of a cell Ci of the assembly 2.

Each loop 15 comprises a diode D1 in series with the secondary winding 14, this loop 15 being traversed by a balancing current Isi.

A bypass capacitor Cd is mounted in parallel with the primary winding 13 and the switch Q.

The device 1 includes an oscillator 20 allowing a signal to be generated and sent to the gate of the transistor Q to switch this transistor Q.

In the example considered, the signal generated by the oscillator 20 is of the rectangular type with a cyclic ratio D selected so as to generate a total output current (sum of the Isi currents) which is a function of the voltage E at the terminals of the assembly 2.

The frequency Fd of the signal generated by the oscillator 20 is controlled as a function of a temperature measured at the level of the assembly 2.

The temperature is measured, for example, by using a temperature sensor fitted inside the assembly 2.

In the example considered, the oscillator 20 is powered by a current drawn at the terminals of the winding 13 and of the switch Q.

The oscillator 20 is for example configured to function autonomously between 2V and 30V.

In one variant, not shown, the oscillator 20 may be powered by a power source external to the device 1.

An approximate value of the balancing current Isi is given by the expression:

$$Isi \approx \frac{(E-D)^2}{Lp \cdot Fd \cdot (E + k \cdot Vd)}$$

where k is the number of cells Ci in the assembly 2 and Vd a dropout voltage of the diodes Di.

An approximate value of the discharge current Idi is given by the expression (excluding oscillator 20 and leakages from the cells Ci):

$$Idi \approx Isi \cdot \left(\frac{k \cdot Vd}{E}\right)$$

Figure 2:
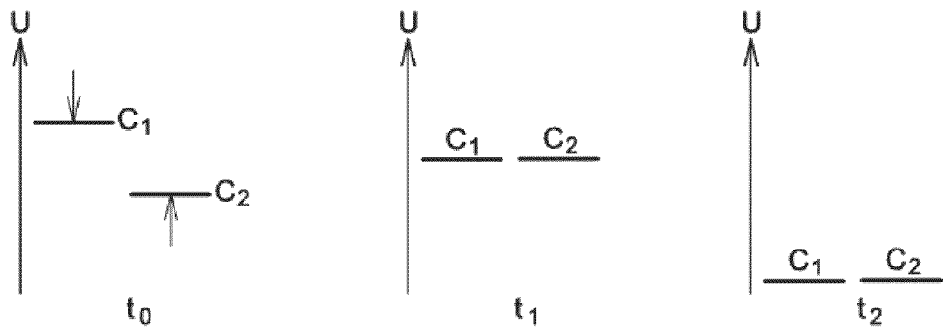
FIG. 2 illustrates different successive balancing steps for two cells of the device in FIG. 1.

There now follows a description, making reference to FIG. 2, of the different successive steps in the balancing of two cells C1 and C2 of the assembly 2.

It is supposed that at the instant t0, the voltage at the terminals of cell C1 is greater than the voltage at the terminals of cell C2. In other words, cell C1 is more highly charged than cell C2.

Cells C1 and C2 are balanced with the aid of the balancing circuit 10 by drawing energy at the terminals of the assembly 2, then the energy thus drawn is distributed by the transformer 11, via the primary winding 13 and the secondary windings 14, to the cells which are less charged, for example to cell C2.

So, between the instants t0 and t1, the voltage at the terminals of cell C1 diminishes and that at the terminals of cell C2 increases until it reaches more or less the same level of charge as cell C1.

Then, between t1 and t2, cells C1 and C2 discharge at essentially the same rate, to reach essentially the same level of discharge, for example close to 0.2V for each cell, in the case of a deep discharge.

The balancing circuit 10 thus enables differences between the leakage currents of the energy storage cells Ci to be compensated, while supplementing a natural discharge of the assembly 2 of cells by adding energy to the cells with the lowest charging voltage, which ensures automatic balancing during discharge.

When the assembly 2 is in balance, the discharge currents Idi are essentially identical to the leakage currents of the cells Ci, and are proportional to the losses of the balancing circuit 10 and of the oscillator 20.

The main part of the losses of the balancing circuit 10 originates from the diodes Di taking account of the dropout voltages Vd.

In the example just described, the cells Ci are balanced in the discharge phase without requiring energy provided by an energy source other than the cells.

The discharge of the cells Ci can thus, if necessary, be relatively intensive.

Figure 3:
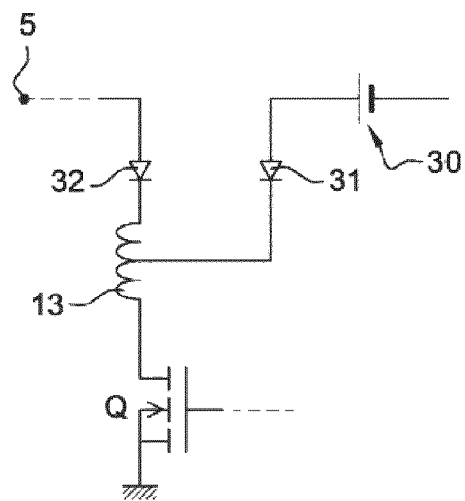
FIG. 3 represents, in diagram form and partially, a modification of one portion of the device in FIG. 1.

As a variant, as illustrated in FIG. 3, the balancing circuit 10 may be configured to be powered by an external energy source, for example a battery 30.

This battery 30 is connected to the primary winding 13 with the interposition of a diode 31.

A diode 32 may be provided in series with the primary winding 13.

Figure 4:
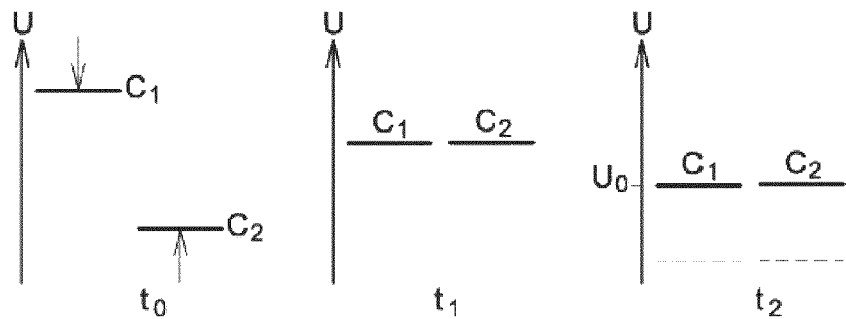
FIG. 4 illustrates different successive balancing steps for two cells of the device in FIG. 3.

In the example in FIG. 3, the balancing of the cells Ci is essentially identical to the previous example (see FIG. 4 between t0 and t1).

However, in the example in FIG. 3, the charging voltage of the cells C1 and C2 is maintained at a predetermined level Uo by adding energy from the battery 30, as indicated in the diagram for the instant t2 in FIG. 4.

In the examples just described, the balancing circuit 10 is configured so that the energy drawn from at least one of the cells Ci is stored in the form of inductive energy before being transferred to one or more other cells.

Figure 5:
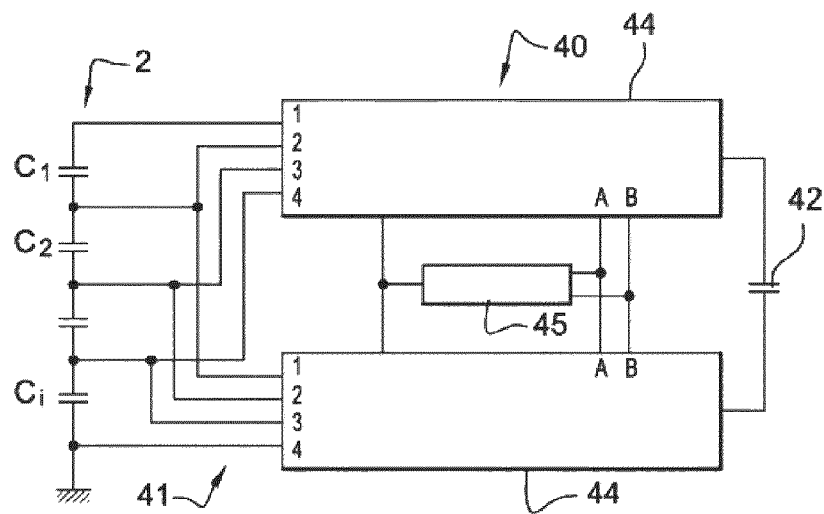
FIG. 5 represents, in diagram form and partially, an energy storage device according to another embodiment of the invention.

FIG. 5 shows an energy storage device 40 consisting of an assembly 2 of energy storage cells Ci similar to that described in reference to FIG. 1, and a balancing circuit 41 configured so that the energy drawn from at least one of the cells Ci is stored in the form of capacitive energy before being transferred to one or more cells.

To this end, the balancing circuit 41 includes a capacitor 42 connected to the assembly 2 of cells Ci via two multiplexers 44, in particular of the analogue type.

These multiplexers 44 may, if necessary, be powered by a current drawn from the cells Ci. The multiplexers 44 may thus be of the floating type.

The multiplexers 44 are connected to an oscillator 45 configured so that when it is in operation, the multiplexers 44 draw energy from one of the cells Ci to recharge the capacitor 42.

Then the multiplexers 44 distribute the energy stored in the capacitor 42 to one or more cells Ci which is/are the most discharged.

In one variant, not shown, it is possible to connect an inductive resistor in series with the capacitor 42 so as to limit the current pulses or to enable more effective balancing by making use of the resonance of the LC circuit.

The device 40 may, if necessary, be integrated into an integral circuit or Asic (Application-Specific Integrated Circuit).

The device 40 may, if necessary, comprise a diagnostic system (not shown) for determining the differences in voltage between the cells Ci and/or determining the maximum voltage at the terminals of each cell, in particular with a view to doing a health check of the cells.

The diagnostics of the device 40 may, if required, be realised in cycles, for example of several minutes per day when the vehicle is stationary, and constantly when the vehicle is in use, making it possible to limit the energy consumption depending on the diagnostics.

Obviously, the invention is not limited to the embodiments just described.

Figure 6:
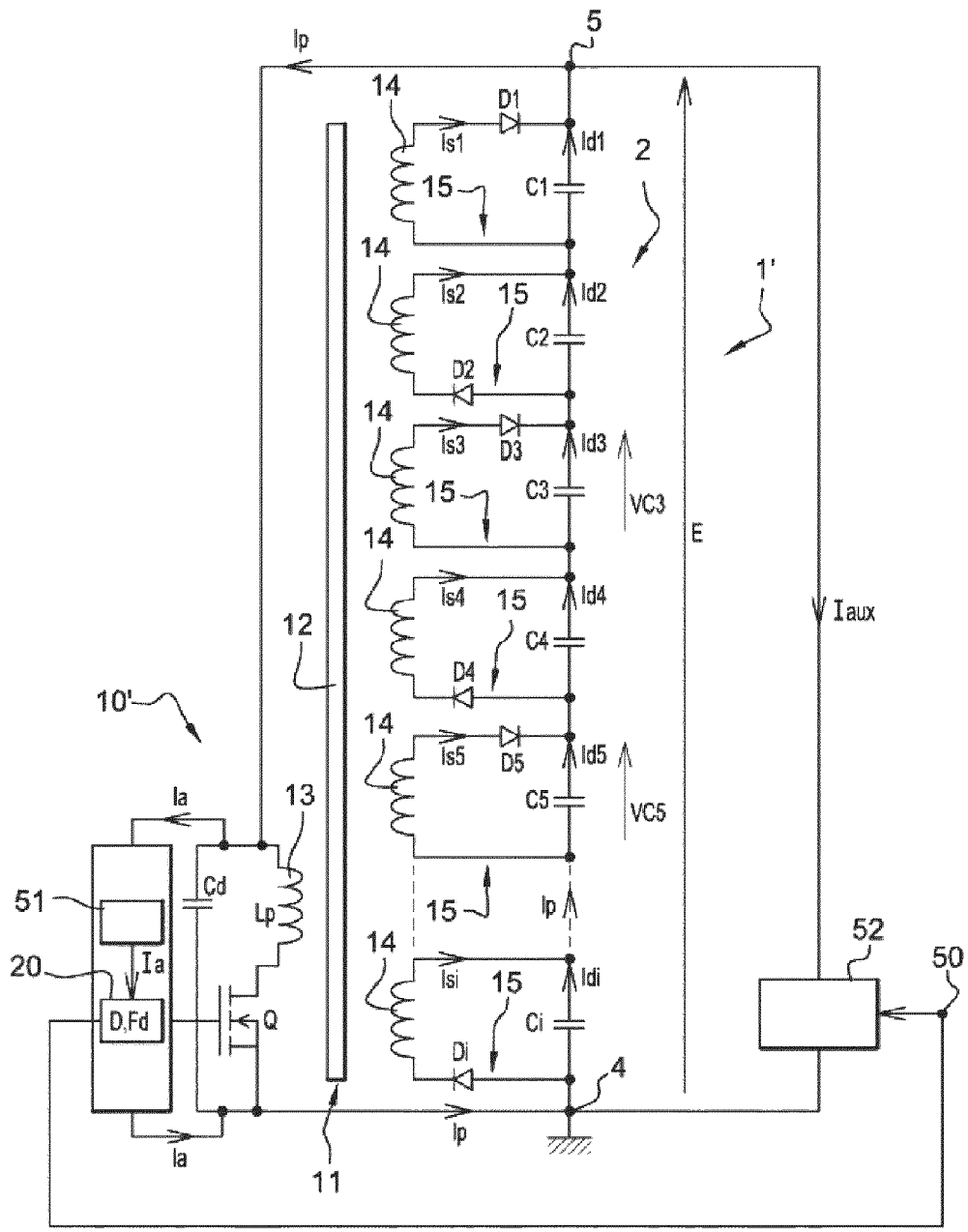
FIG. 6 represents, in diagram form and partially, an energy storage device according to another embodiment of the invention.

FIG. 6 shows an energy storage device 1' according to another embodiment of the invention.

This device 1' is similar to the device 1 previously described, with the exception of the balancing circuit.

The balancing circuit 10' of the device 1' comprises an oscillator 20, an auxiliary electrical power module 51 to power the oscillator 20, and an accelerated discharge module 52 connected to the oscillator 20 at point 50.

The module 52 is connected to the terminals 4 and 5 of the assembly of cells 2 and carries a current Iaux.

The balancing circuit 10' is configured to enable, in a first phase Ph1, a discharge and a balancing of the cells Ci up to a low predetermined voltage threshold Einf at the terminals of the energy storage cells and, in a second phase Ph2 which follows the first phase Ph1, an accelerated discharge of the cells below said low predetermined threshold Einf.

Figure 7:
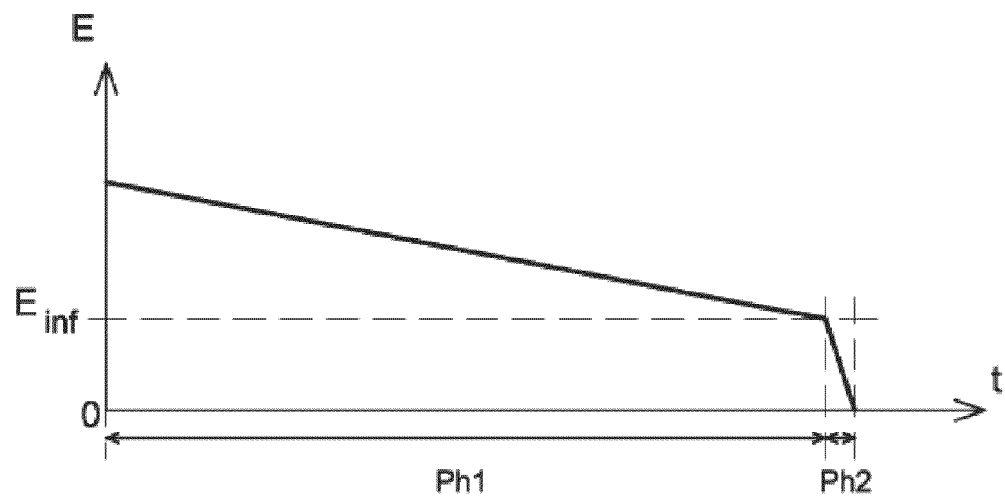
FIG. 7 is a graph illustrating in diagram form the variation of the voltage at the terminals of the assembly of cells in FIG. 6, as a function of time.

The variation in the voltage E at the terminals 4 and 5 of the assembly of cells 2 in phases Ph1 and Ph2 is shown in FIG. 7.

The profile of the variation in voltage E may be more or less rectilinear.

Phase Ph1 may last, for example, several days or weeks corresponding for example to a long period when the vehicle is parked, and phase Ph2 several hours, for example about two hours.

The low threshold Einf, in the example described lies between 1.5 and 2 Volts.

The balancing circuit 10' is configured so that at the end of the second phase Ph2, the voltage E at the terminals of the cells is essentially zero.

During the first phase Ph1, the discharge may be slow, so that when the device is left inactive over a relatively long period, the cells Ci discharge as little as possible in order to limit energy losses.

This discharge during phase Ph1 is supplemented by the balancing of the cells Ci in the way described in reference to FIG. 1, using the transformer 11 and its control system.

As a variant, the balancing supplementing the discharge of the cells Ci may be realised in any other appropriate manner, for example using multiplexers.

During the first phase Ph1, the current Iaux is zero.

During the second phase Ph2, when the voltage drops below the low predetermined threshold Einf, and becomes insufficient to enable balancing of the cells, the balancing circuit 10' controls an accelerated discharge of the cells Ci, using a discharge current Iaux of the cells with a higher intensity than that of the discharge currents in the cells during the first phase Ph1.

The rapid discharge of the cells in the second phase Ph2, due to this strong discharge current Iaux, ensures that all the cells of the assembly attain a full discharge, to more or less 0 Volt, in a much shorter period of time than that of the first phase Ph1.

The rapid discharge imposed during the second phase Ph2 enables the cells Ci to be fully discharged before any imbalance occurs between these cells.

When the cells Ci are recharged by an external energy source, for example by a DC/DC converter in a vehicle, these cells are charged from a voltage more or less equal to 0 Volt, which ensures a balanced recharge.

The auxiliary power module 51 comprises a transformer such as a flyback type transformer, not shown.

This auxiliary electrical power module 51 ceases to function when the low threshold of voltage Einf is attained.

Figure 8:
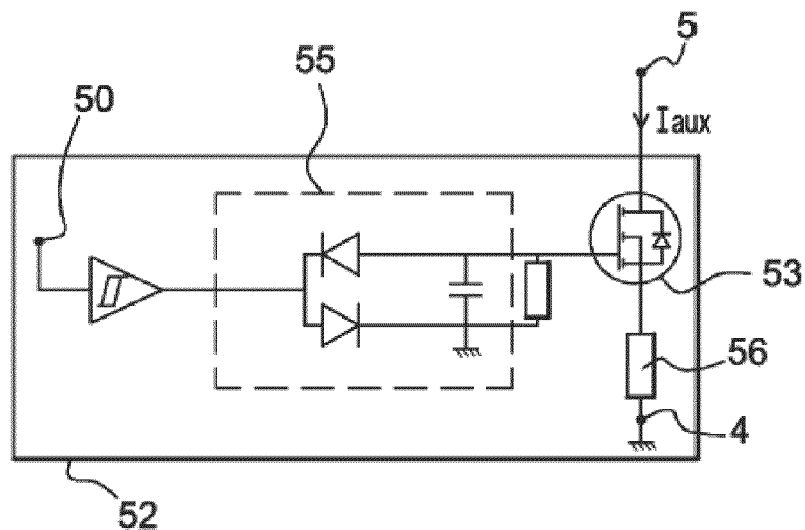
FIG. 8 represents, in diagram form and partially, an accelerated discharge module of the device in FIG. 6, FIGS. 9 to 11 are block diagrams illustrating different devices according to embodiments of the invention.

As shown in FIG. 8, the accelerated discharge module 52 comprises an N-channel depletion mode MOSFET transistor 53. This MOSFET transistor 53 is for example a transistor of the model BSP149 marketed by INFINEON.

The accelerated discharge module 52 also comprises a diode pump 55 connected to the transistor 53 so that, when the auxiliary power module 51 and the oscillator 20 cease to function (the intensity of the current Ia being close to 0 mA), this transistor 53 can be made conductive (the voltage of the gate of this transistor 53 going to 0 Volt).

The current Iaux may then attain about 45 mA for example, at the start of phase Ph2, and then decrease to about 0 mA at the end of phase Ph2.

The accelerated discharge module 52 also comprises at least one resistor 56 connected to the cells Ci at the end of the second phase Ph2 and configured to prevent any recharge due to the electrochemical effect of the energy storage cells.

The balancing circuit 10' is configured in such a way that the discharge of the second phase is deactivated when the voltage E at the terminals of the assembly 2 of the cells becomes greater than a high voltage threshold Esup, for example about 7 Volts.

Figure 9:
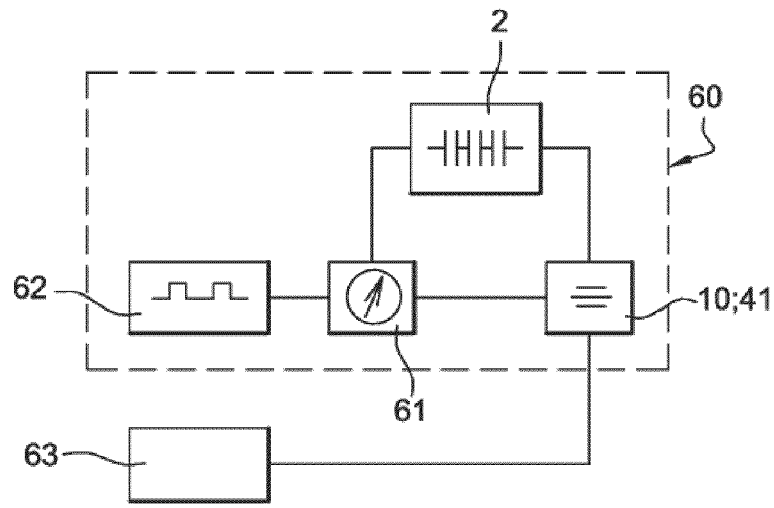

FIG. 9 shows an energy storage device 60 according to another embodiment of the invention, comprising:

an assembly 2 of energy storage cells Ci connected in series, a balancing circuit 10; 41 configured to permit balancing of the cells while they are discharging, by circulating one or more balancing currents Isi in one or more cells of the assembly, as described above, a diagnostic system 61 configured to enable the delivery of at least one piece of information associated with at least one of the cells of the assembly 2.

The balancing circuit 10; 41 is configured to control the balancing current or currents Isi at least depending on external information independent of the assembly 2 of energy storage cells and/or of a piece of information associated with at least one of the cells, delivered by the diagnostic system 61.

The diagnostic system 61 is connected to an oscillator 62 configured to control its starting.

The oscillator 62 is configured to provoke the triggering of the diagnostic system 61 at regular intervals of time, for example every hour, when the vehicle is stationary, for example in case of long-term parking.

The oscillator 62 has low energy consumption so that the energy consumed for the balancing is as low as possible.

The balancing circuit 10; 41 is connected to a module 63 of the vehicle, for example an engine control system or an onboard computer, configured to control the balancing circuit 10; 41 depending on information external to the device 60.

The external pieces of information are selected from: voltage information for a battery powering the vehicle's onboard network, information issued by a battery management system (BMS), information for activation of the balancing circuit, in particular issued by an engine control system or an onboard computer, information linked to the detection of an ignition key in position +APC "after contact".

Depending on external information processed by the module 63, the balancing circuit 10; 41 switches between two modes, a first mode in which the balancing of the energy storage cells is supplemented by one or more low balancing currents, especially when the vehicle is stationary, and a second mode in which the balancing of the cells is supplemented by one or more strong balancing currents, especially when the vehicle is moving.

The balancing circuit 10; 41 switches from the first mode to the second mode once the voltage at the terminals of a battery of the vehicle or at the terminals of the assembly 2 of cells exceeds a predetermined threshold, for example equal to 12 or 13 Volts.

The stoppage of the balancing circuit 10; 41 is provoked, in the example described, by the diagnostic system 61 when this detects a satisfactory state of the cells in terms of balancing.

The diagnostic system 61 is configured to deliver a piece of information selected from: temperature information associated with at least one of the cells Ci, voltage information associated with one of the cells, voltage information associated with several cells of the assembly, voltage information at the terminals of the assembly itself.

In the example just described, the device includes an oscillator 62 and is connected to an external module 63.

If the device has no oscillator 62, this is still within the scope of the present invention.

Figure 10:
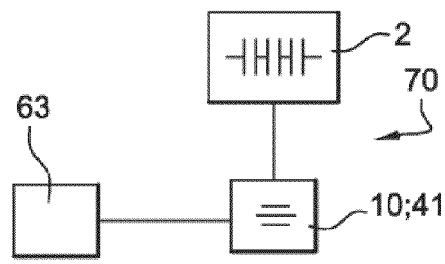

For example, FIG. 10 shows a device 70 comprising a balancing circuit 10; 41 directly controlled by an external module 63.

With the aim of limiting consumption when the vehicle is stationary, the external module 63 may be configured to reactivate the balancing circuit, which may avoid the need for an oscillator associated with the balancing circuit itself.

Figure 11:
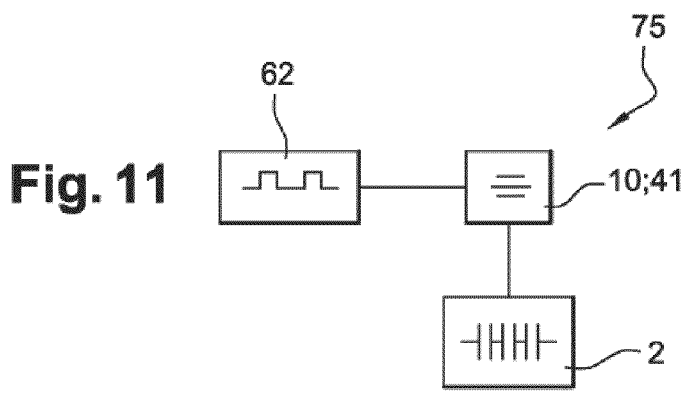

FIG. 11 shows a device 75 according to another embodiment of the invention, comprising a balancing circuit controlled by an oscillator 62, without the use of external pieces of information.

The reactivation and the stoppage of the balancing circuit 10; 41 are controlled solely by the oscillator 62.

For example, the balancing circuit 10; 41 functions for 10 minutes every hour or, as a variant, an hour every day, when the vehicle is stationary, in parking position.

Still with a view to minimising energy consumption, it is possible to operate the balancing circuit only when this is effective, in particular when there is a big difference between the voltages of the cells. The rest of the time, it is preferable to leave the balancing circuit inactive and to restart it at the appropriate moment. The time between two successive reactivations is linked, in particular, to the behaviour of the energy storage cells as a function of time and of the rapidity of the balancing circuit.

Once the time between two reactivations has been selected, the reactivation time may be linked to the energy storage cells themselves and to the difficulty of balancing them. This reactivation time value may be used to find out about any drift of certain cells typifying their end of life.

Figure 12:
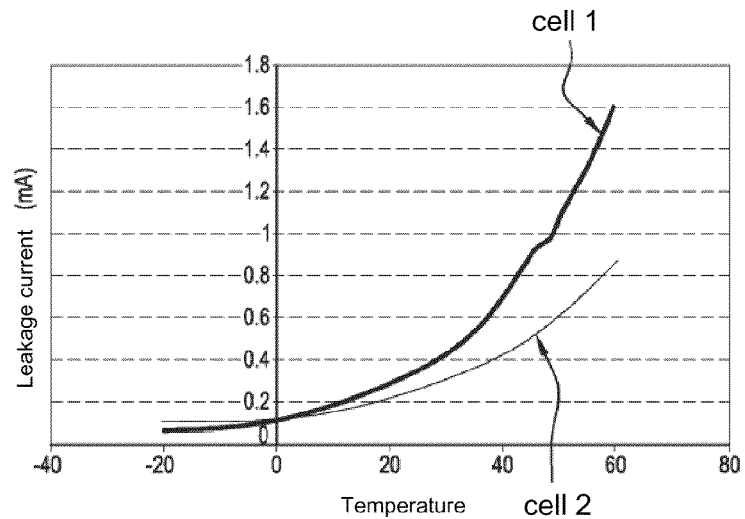
FIG. 12 is a graph with curves of leakage current as a function of temperature.

As shown in FIG. 12, the leakage currents of the cells Ci are a function of temperature.

The difference between leakage currents of two cells may increase with a rise in temperature.

Therefore, at relatively high temperatures, above a threshold, for example above 40° C., the balancing circuit 10; 41 is instructed to function with a view to balancing the cells.

The balancing circuit may be switched off, if required, once the temperature falls back below 40° C.

Figure 13:
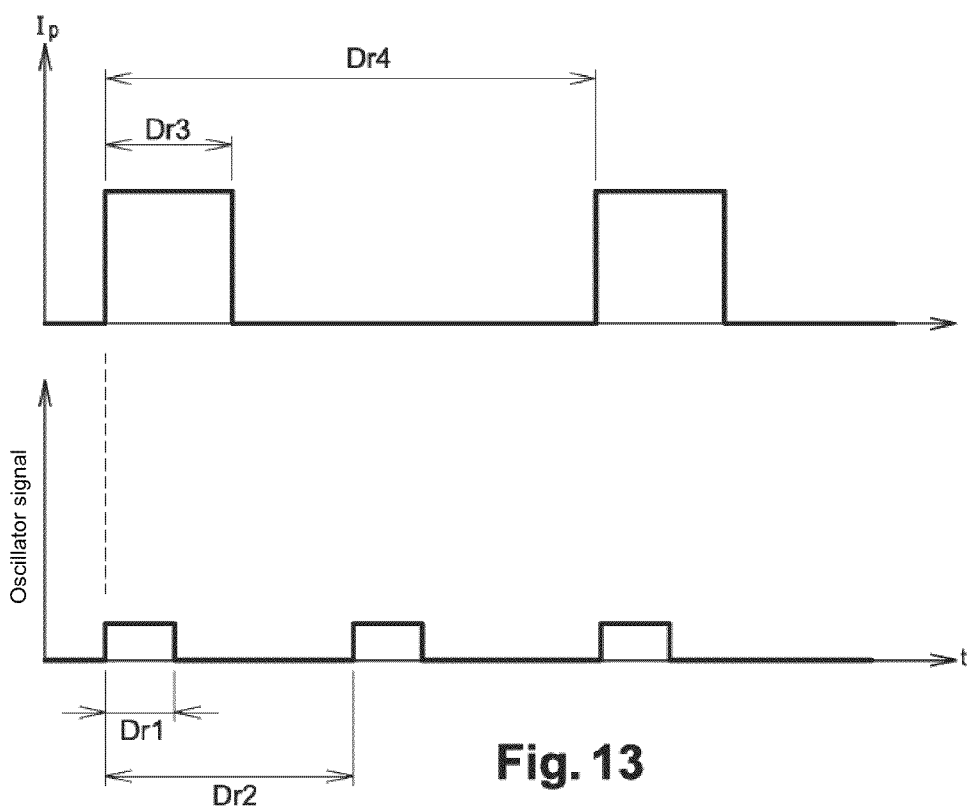
FIG. 13 represents the change in the current Ip as a function of time, and of that of the balancing activation signals.

FIG. 13 shows the change in the current Ip as a function of time, and also those of the signals for reactivation of balancing, for example for the device 60 described in reference to FIG. 9.

The balancing circuit 10; 41 is configured to allow variation of the intensity of the balancing current or currents depending on the state of ageing of the cell or cells Ci, in particular of at least one of the following pieces of information: a value of the internal resistance of the energy storage cell or cells Ci (ESR or Equivalent Series Resistance), a capacitance value of the energy storage cell or cells, the state of charge of one or more cells (SOC), the state of energy of one or more cells (SOE).

The period Dr2 between two balancing reactivation signals, and potentially the duration of a balancing phase Dr3, are selected depending on the state of ageing of the cell or cells Ci, in particular of at least one of the following pieces of information: a value of the internal resistance of the energy storage cell or cells (ESR or Equivalent Series Resistance), a capacitance value of the energy storage cell or cells, the state of charge of one or more cells (SOC), the state of energy of one or more cells (SOE).

Since the balancing is realised intermittently, the duration Dr3 of a balancing phase and/or the duration Dr4 between two successive triggerings of the balancing are linked to the state of ageing of the cell or of the cells Ci, in particular of at least one of the following pieces of information: a value of the internal resistance of the energy storage cell or cells (ESR or Equivalent Series Resistance), a capacitance value of the energy storage cell or cells, the state of charge of one or more cells (SOC), the state of energy of one or more cells (SOE).

The duration Dr2 is for example about one hour, and the duration Dr1 of the balancing reactivation signal is for example about 100 ms.

The balancing phase of duration Dr3 is advantageously triggered as a function of the difference in voltage between the energy storage cells Ci.

The optimisation of the ratios Dr1/Dr2 and Dr3/Dr4 and of the intensity Ip enables, firstly, the auto-discharge of the assembly of cells Ci to be minimised in order to optimise the available rate of the assembly of cells Ci depending on the service profile and of its state of ageing, and secondly, to have an image of the state of health of the assembly of cells Ci which can be used in a predictive strategy of the end of life of the assembly of cells Ci.

Cartography of the ageing of the assembly of cells Ci and/or a self-learning system may be used to optimise the balancing parameters.

The device 60 is configured to deliver information about the end of life of the energy storage cell or cells Ci, in particular in the form of a warning signal, as a function of at least one of the frequency of activation of the balancing circuit and the intensity of the balancing current or currents.

For example, when the period Dr4 is less than or equal to a predetermined time threshold, selected in particular to be equal to 24 hours, and/or when the current Ip is greater than a predetermined current threshold, in particular selected to be equal to 50 mA, the information about the end of life of the energy storage cell or cells Ci is delivered.

The invention claimed is:

1. An energy storage device, in particular for a motor vehicle, comprising:
   an assembly (2) of energy storage cells (Ci) connected in series;
   a balancing circuit connected between the storage cells configured to enable the cells (Ci) to be balanced while they being discharged, by circulating at least one balancing current in at least one of the cells of the assembly (2); and
   a diagnostic system (61) configured to enable the delivery of at least one piece of information associated with at least one of the cells of the assembly;
   the balancing circuit being configured to control at least one of the balancing current or the duration of balancing (Dr3) at least depending on an external piece of information independent of the assembly of energy storage cells or of the external piece of information associated with at least one of the cells, delivered by the diagnostic system.

2. The device according to claim 1, wherein the diagnostic system is configured to deliver information including temperature information associated with at least one of the cells, voltage information associated with one of the cells, voltage information associated with several cells of the assembly, voltage information at the terminals of the assembly itself.

3. The device according to claim 2, wherein the balancing circuit is configured to allow the intensity of the balancing current to be varied from 0 Amperes to a maximum predetermined value.

4. The device according to claim 3, wherein the balancing circuit (10; 41) is maintained in operation while the temperature associated with at least one of the cells is above a threshold equal to about 40° C.

5. The device according claim 4, wherein the diagnostic system (61) is configured to control at least one of the starting and the interruption of the balancing circuit.

6. The device according to claim 1, wherein the external piece of information is selected from one of: voltage information for a battery powering the vehicle's onboard network, information issued by a battery management system (BMS), information for activation of the balancing circuit, wherein such information is issued by an engine control system and information linked to an onboard network power supply by detection of an ignition key in position +APC.

7. The device according to claim 6, wherein the balancing circuit is configured so as to be able to function in two modes, a first mode in which the balancing of the energy storage cells is accompanied by one or more low balancing currents, when the vehicle is stationary, and a second mode in which the balancing of the cells is accompanied by one or more strong balancing currents, when the vehicle is moving.

8. The device according to claim 7, wherein the balancing circuit switches from the first mode to the second mode once the voltage at the terminals of a battery of the vehicle or at the terminals of the assembly of cells exceeds a predetermined threshold equal to 12 to 13 Volts.

9. The device according to claim 1, further comprising an oscillator (62) configured to control at least one of the starting and the interruption of the balancing circuit intermittently via the diagnostic system (61).

10. The device according to claim 9, wherein the oscillator (62) is configured to control the starting and the interruption of the diagnostic system (61).

11. The device according to claim 9, wherein the fact that the oscillator directly controls the balancing circuit.

12. The device according to claim 9, wherein the balancing circuit is configured to function for a predetermined period after being started by the oscillator (62), then, depending on the circumstances, to switch itself off after this predetermined period.

13. The device according to claim 1, wherein the balancing circuit comprises one or more transformers of the flyback type.

14. The device according to claim 1, wherein the balancing circuit is configured to allow an intensity of the balancing current or currents to be varied depending on the state of ageing of the cell or cells, the ageing is determined by at least one of the following pieces of information: a value of the internal resistance of the energy storage cell or cells (ESR or Equivalent Series Resistance), a capacitance value of the energy storage cell or cells, the state of charge of one or more cells (SOC), the state of energy of one or more cells (SOE).

15. The device according to claim 1, wherein the balancing is realized intermittently; and wherein the duration (Dr3) of at least one of a balancing phase and the duration (Dr4) between two successive triggerings of the balancing are linked to the state of ageing of the cell or of the cells Ci, the ageing being determined by at least one of the following pieces of information: a value of the internal resistance of the energy storage cell or cells (ESR or Equivalent Series Resistance), a capacitance value of the energy storage cell or cells, the state of charge of one or more cells (SOC), the state of energy of one or more cells (SOE).

16. The device according to claim 1, wherein the balancing is realized intermittently; and wherein the duration (Dr2) between two signals for the reactivation of balancing is selected depending on the state of ageing of the cell or of the cells, the ageing being determined by at least one of the following pieces of information: a value of the internal resistance of the energy storage cell or cells (ESR or Equivalent Series Resistance), a capacitance value of the energy storage cell or cells, the state of charge of one or more cells (SOC), the state of energy of one or more cells (SOE).

17. The device according to claim 1, wherein the diagnostic system is configured to deliver end-of-life information for the energy storage cell or cells, the information is in the form of a warning signal, as a function of at least one of the frequency of activation of the balancing circuit and the intensity of the balancing current or currents.

18. An energy storage device, in particular for a motor vehicle, comprising:
an assembly (2) of energy storage cells (Ci) connected in series;
a balancing circuit connected to the cells configured to enable balancing of the cells (Ci) while they are being discharged; and
an oscillator (62) configured to enable at least one of an intermittent triggering and a stoppage of the balancing circuit.

19. A method for balancing during a discharge, when the motor vehicle is stationary or running, of an energy storage device associated with the motor vehicle comprising an assembly (2) of energy storage cells connected in series, the method comprising the following steps:
enabling a balancing of the cells (Ci) while they are being discharged, by circulating one or more balancing currents in one or more cells of the assembly (2); and
controlling the balancing current or currents, in particular to provoke the triggering of the balancing, at least depending on an external piece of information independent of the assembly of energy storage cells and/or information associated with at least one of the cells.

20. The method according to claim 19, wherein the optimization of the ratios (Dr1/Dr2), where Dr1 is a duration of a balancing activation signal and Dr2 is a duration between two signals for reactivation of a balancing phase, and (Dr3/Dr4), where Dr3 is a duration of the balancing phase and Dr4 is a duration between successive triggerings of a balancing phase, and of the intensity (Ip) is selected so as, firstly, to minimize the auto-discharge of the assembly of cells (Ci) in order to optimize the rate of availability of the assembly of cells (Ci) depending on the service profile and its state of ageing, and secondly, to have an image of the state of health of the assembly of cells (Ci) which can be utilized in a strategy for predicting the end of life of the assembly of cells (Ci).

21. An energy storage device (1'), in particular for a motor vehicle, comprising:
an assembly (2) of energy storage cells (Ci) connected in series; and
a balancing circuit (10') connected to the cells configured to enable, in a first phase (Ph1), a discharge and a balancing of the cells (Ci) up to at least a low predetermined threshold (Einf) of voltage at the terminals of the energy storage cells and, in a second phase (Ph2) which follows the first phase, an accelerated discharge of the cells below the low predetermined threshold.

22. The device according to claim 21, wherein the balancing circuit is configured so that at the end of the second phase (Ph2), the voltage at the terminals of each of the cells (Ci) is essentially zero.

23. The device according to claim 22, wherein the balancing circuit (10') is configured so that the duration of the first phase (Ph1) is greater than that of the second phase (Ph2) at least 10 times to at least 100 times greater.

24. The device according to claim 23, wherein the balancing circuit (10') ceases the forced balancing of the cells at the end of the first phase.

25. An energy storage device comprising:
an assembly (2) of energy storage cells (Ci) connected in series; and
a balancing circuit (10; 41) connected to the energy storage cells configured to enable the drawing of energy from at least one of said cells and the distribution of the energy is thus drawn to at least one other of said cells;
the balancing circuit (10) being configured to allow, during one phase of discharge of the energy storage device, the charging voltage of at least one of the cells to be increased only with the energy drawn from at least one of the energy storage cells of the device;
the balancing circuit (10) being also configured to enable symmetrical discharge of the cells (Ci) to a voltage at least 3 times weaker than the maximum serviceable voltage of the cells at least 10 times weaker to at least 20 times weaker.

26. The device according to claim 25, wherein the balancing circuit (10) is configured so that it can be permanently connected to a power supply network of a motor vehicle.

* * * * *